United States Patent [19]

Ewald et al.

[11] Patent Number: 4,729,290

[45] Date of Patent: Mar. 8, 1988

[54] FLUID PRESSURE ACTUATED SPRING BRAKE CYLINDER

[75] Inventors: Jurgen Ewald, Laatzen; Josef Frania; Roland Glogowschek, both of Hanover, all of Fed. Rep. of Germany

[73] Assignee: WABCO Westinghouse Fahrzeugbremsen GmbH, Hanover, Fed. Rep. of Germany

[21] Appl. No.: 915,590

[22] Filed: Oct. 6, 1986

[30] Foreign Application Priority Data

Oct. 16, 1985 [DE] Fed. Rep. of Germany ....... 3536766

[51] Int. Cl.[4] .............................................. F15B 1/04
[52] U.S. Cl. ....................................... 92/130 A; 92/63; 92/64
[58] Field of Search ............................ 92/63, 130 A, 64

[56] References Cited

U.S. PATENT DOCUMENTS

| 3,181,433 | 5/1965 | Cruser . |
| 3,188,916 | 6/1965 | Beatty ................................. 92/63 X |
| 3,302,530 | 2/1967 | Dobrikin . |
| 3,402,792 | 9/1968 | Masser ............................. 92/130 A |
| 4,116,114 | 9/1978 | Swander ........................... 92/130 A |

FOREIGN PATENT DOCUMENTS

| 1268002 | 5/1968 | Fed. Rep. of Germany . |
| 2000369 | 7/1971 | Fed. Rep. of Germany . |
| 1655999 | 8/1971 | Fed. Rep. of Germany . |
| 7118947 | 12/1971 | Fed. Rep. of Germany . |
| 2105640 | 8/1972 | Fed. Rep. of Germany . |
| 2712135 | 9/1978 | Fed. Rep. of Germany . |
| 2629565 | 12/1978 | Fed. Rep. of Germany . |

Primary Examiner—Alan Cohan
Attorney, Agent, or Firm—J. O. Ray, Jr.

[57] ABSTRACT

Disclosed is a spring brake cylinder for use on motor vehicles. The cylinder is actuated to a release position in response to fluid pressure. The cylinder includes a spring actuator inserted between the brake cylinder base and a spring brake piston. A tensioning device is provided which mechanically acts upon the spring brake piston and facilitates adjustment of the distance between the spring brake piston and the cylinder base. The spring brake piston and the spring actuator can be assembled into a pretensioned unit outside the spring brake cylinder.

8 Claims, 1 Drawing Figure

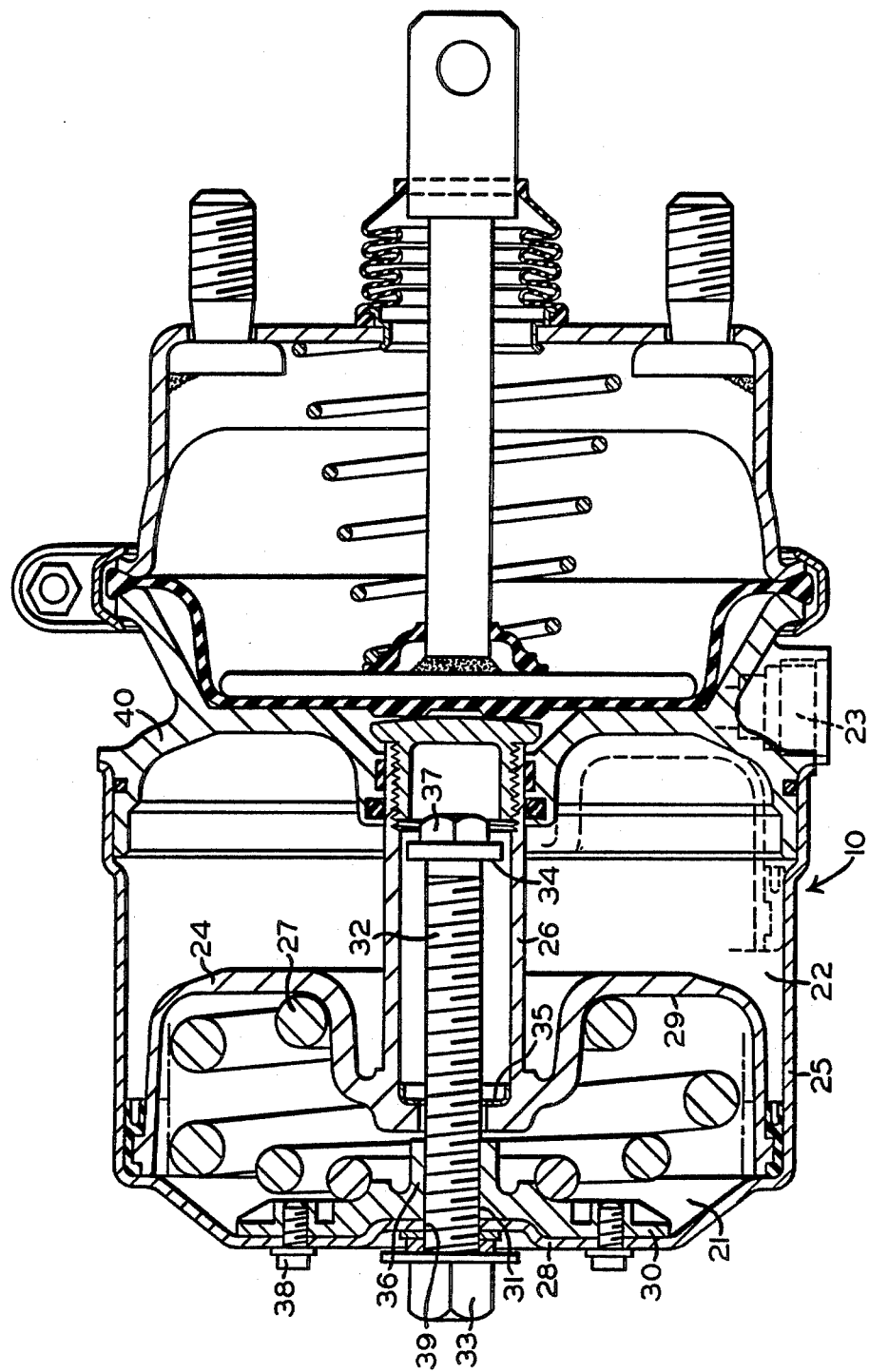

FLUID PRESSURE ACTUATED SPRING BRAKE CYLINDER

FIELD OF THE INVENTION

The present invention relates, in general, to spring brake cylinders and more particularly the invention relates to a fluid pressure actuated spring brake cylinder for over-the-road type vehicles.

BACKGROUND OF THE INVENTION

Fluid pressure actuated spring brake cylinders have been used on railway-type vehicles for a number of years. Generally, in the spring brake cylinders used prior to the present invention, the pot-shaped cylinder of the spring actuator portion is designed as a single piece with the cylinder base. See, for example, German Patent DE-PS No. 2943763. In this spring brake cylinder, a flange, which is located opposite the base, is detachably connected to the cylinder. This flange member serves the dual purpose of sealing the pressure chamber of the spring brake cylinder against the atmosphere and axially guiding the spring brake piston. The side of the flange member that is opposite the spring brake cylinder contains a service brake cylinder.

This prior art type spring brake cylinder is assembled by first placing a helical coil compression spring, which serves as the spring brake actuator, on the cylinder base. Subsequently, the spring brake piston is inserted into the cylinder with the assistance of a specially designed mounting device. The spring brake piston is moved toward the spring actuator until a mechanical brake release device, a portion of which is located outside of the cylinder base, can be mounted. The mechanical brake release device includes a screw bolt and a threaded disk. During assembly, the brake release device is used to pretension the spring brake piston at a predetermined position against the spring actuator so that the mounting device can be safely removed and the cylinder can then be connected to the flange member. When the brake release device is then loosened, the force of the released spring actuator moves the spring brake into an operating position. In this operating position, it can execute a working stroke when opened to fluid pressure.

During disassembly, the spring brake cylinder is dismantled by first separating the cylinder from the flange. Subsequently, the special mounting device is used to move the spring brake piston toward the spring actuator until the mechanical brake release device can be removed. The mounting device is then slowly relieved so that the force of the released spring actuator pushes the spring brake piston out of the cylinder.

As is evident from the above description, both the assembly and the disassembly process require a sequence of mounting steps. Therefore, they are relatively expensive and clearly not optimum with respect to the amount of time required for such assembly or disassembly. This is because the spring brake cylinder can only be maneuvered in the way described above by the special mounting device possessing the capability of pretensioning the spring actuator and holding it securely in place in its pretensioned position.

Another spring brake cylinder, which is also known in the art from German Patent DE-PS 1680232, has a base which is connected to the spring brake cylinder by an axial locking ring. In this arrangement, the axial locking ring can be detached from the assembly. This then allows the base, the spring actuator and the spring brake piston to be joined into one preassembled unit. During the assembly process, the spring brake piston can be pretensioned against the spring actuator through the assistance of the brake release device. After assembly, this unit can be inserted into the spring brake cylinder where it is then connected to such spring brake cylinder by way of the base and the axial locking ring. In this assembly, when the brake release device is subsequently loosened, the spring brake cylinder becomes operational in the manner described above.

A spring brake cylinder of this particular design, in which the base can be separated from the cylinder, requires the use of reinforced cylinder walls, at least in the area of the mounting for the axial locking ring. It should therefore be evident to those persons skilled in the braking art that a cylinder designed as a plate pulling part of light weight construction, which is highly desirable, cannot be achieved.

This particular spring brake cylinder arrangement includes an additional significant disadvantage in that, should the axial locking ring be loosened either inadvertently, or if inappropriately tightened initially while the spring brake cylinder is in an operative state, a sudden and uncontrolled release of the spring actuator will cause the unit, consisting of the base, spring actuator, spring brake piston and the brake release device, to be propelled out of the spring brake cylinder like a bullet. Therefore, to prevent this occurrence, both the assembly and the disassembly processes for this spring brake cylinder require the strict adherence to of rigid shop-based safety precautions which add substantially to the manufacturing cost of the spring brake cylinder. Even with the added precautions, it is not always possible to eliminate human error.

SUMMARY OF THE INVENTION

The present invention teaches a spring brake cylinder, particularly a fluid pressure actuated spring brake cylinder for road vehicles. The spring brake cylinder includes a spring actuator which consists of a helical coil compression spring that is inserted between the spring brake cylinder base and a spring brake piston. A tensioning device is provided which mechanically acts upon the spring brake piston. The tensioning device facilitates adjustment of the distance between the spring brake piston and the spring brake cylinder base. Further, according to the teachings of the present invention, the spring brake piston can be joined with the spring actuator into a pretensioned assembly unit while outside the confines of the spring brake cylinder.

OBJECTS OF THE INVENTION

It is, therefore, one of the objects of the present invention to provide a spring brake cylinder in which spring brake piston and the spring actuator can be assembled and pretensioned against one another while they are either inside or outside of the spring brake cylinder and they can be installed as a unit in the spring brake cylinder or removed as a unit from the spring brake cylinder.

Another object of the present invention is to provide a spring brake cylinder which can be assembled or disassembled without requiring the use of a specially designed mounting device so that no specialized workshop is required to make relatively simple repairs such as the replacement of seals.

A further object of the present invention is to provide a spring brake cylinder which minimizes the chances of human error during either assembly or disassembly of the spring brake cylinder.

Still another object of the present invention is to provide a spring brake cylinder which does not require reinforced cylinder walls thereby providing a spring brake cylinder of lighter weight construction.

Yet another object of the present invention is to provide a spring brake cylinder which has an improved tensioning device which simplifies both the assembly and the disassembly of the spring brake cylinder.

In addition to the above objects and advantages of the present invention, various other objects and advantages will become more readily apparent to those persons skilled in the vehicle braking art from the following more detailed description of the invention when such description is taken in conjunction with the attached drawing figure and the appended claims.

BRIEF DESCRIPTION OF THE DRAWING

FIG. 1 is a cross-sectional view which shows a spring brake cylinder having a mechanical tensioning device and including a spring plate which can be detached from the spring brake cylinder base that is constructed according to a presently preferred embodiment of the invention.

DETAILED DESCRIPTION OF THE INVENTION

In principle, the spring brake cylinder, generally designated 10, as represented in the drawing, is generally known in the prior art. The spring brake cylinder 10 includes a spring brake chamber 21 and a fluid pressure medium chamber 22. The presently preferred fluid pressure is pneumatic. The pneumatic pressure chamber 22 can be pressurized via a pneumatic pressure connection 23 which is in fluid communication with the pressure chamber 22. When pneumatic pressure is communicated into pressure chamber 22, a spring brake piston 24 positioned for axial reciprocal movement within a cylinder 25, which forms a part of the spring brake cylinder 10, is moved against the force of a compression spring 27 into a brake released position which is as illustrated in the drawing. The compression spring 27 is presently preferred to be of a helical coil type compression spring. The spring brake piston 24 is connected to a brake linkage (not shown) on a vehicle by a piston rod 26 in such a way that, after bleeding the pneumatic pressure from the chamber 22, the spring brake piston 24 is moved by the compression spring 27 into a position in which the brakes of the vehicle are fixed over the brake linkage as shown by the broken lines in the drawing.

In the event of a failure, for whatever reason, of the pressurized air supply to the spring brake cylinder the brakes, when applied in the manner described above, can be mechanically released. This can be accomplished with the tensioning device which is constructed according to the principles of the present invention. The tensioning device includes a spring plate 30 positioned adjacent the inner surface of the cylinder base 28 of the cylinder 25. A screw neck 36 which has an inside thread is connected to the spring plate 30. In the presently preferred embodiment, the screw neck 36 is formed integrally with the spring plate 30 as a single unit. A screw bolt 12, which serves as a brake release screw, is threadedly engaged into the screw neck 36. In this manner, the screw bolt 32 is made longitudinally adjustable.

The screw bolt 32 includes a head 33 that is detachably connected thereto at one end. The head 33 is engaged by a tool, such as a wrench, for screwing the screw bolt 32 out of the spring brake cylinder 10 by a predetermined stroke length. Connected to the screw bolt 32 is a screw head 37 which has a shoulder portion 34 that abuttingly engages a supporting surface 35 of the spring brake piston 24. During turning of the screw bolt 32 in a predetermined direction the shoulder portion 34 moves the spring brake piston 24 against the force of the helical coil compression spring 27 into the brake release position as is illustrated in the drawing figure.

In a presently preferred assembly method for the spring brake cylinder 10, the spring brake piston 24, the helical coil compression spring 27, the spring plate 30, and the screw bolt 32 can be assembled into an assembly unit 24, 27, 30 and 32 outside of the cylinder 25. To accomplish this assembly in this manner, the head 33 of the screw bolt 32 is first removed. Thereafter, the screw bolt 32 is pushed into the tube-shaped piston rod 26 until the shoulder portion 34 rests against the supporting surface 35. The helical coil compression spring 27 is then compressed between the spring brake piston 24 and the spring plate 30, in the position shown in the drawing, until the threading of the screw bolt 32 into the inside thread 34 of the screw neck 36 can be achieved. In this position, the spring plate 30 of the tensioning device 30, 36, 31 and 32 engages the end of the outer coil of the helical coil compression spring 27 that is pointing away from the spring brake piston 24.

The distance between the spring plate 30 and the spring brake piston 24 can now be axially adjusted to a predetermined length by turning the screw bolt 32, which passes axially through the spring brake piston 24, the helical coil compression spring 27, and the spring plate 30, with the aid of a tool applied to the screw head 37.

The assembly unit 24, 27, 30 and 32, which has been pretensioned outside of the spring brake cylinder 25 in the manner described above, should only be inserted into the cylinder 25, when the spring brake piston 24 does not exceed its maximum working stroke in relation to the spring plate 30.

The pretensioned assembly unit 24, 27, 30 and 32 is pushed into the cylinder 25, until the spring plate 30 touches the surface of the cylinder base 28 which is facing toward the spring brake chamber 21 and the screwed shank of the screw bolt 32 protrudes through an opening 39 in the cylinder base 28. The head 33 is now connected tightly to the screw shank of the screw bolt 32 which is protruding over the cylinder base 28. The spring plate 30 is connected to the surface of the cylinder base 28 which is facing toward the spring brake piston 24 by connecting devices consisting of screws 38 which can be removed from the outside of the spring brake cylinder 10.

After the fluid pressure chamber 22 has been closed by a cover 39, which also is designed to guide the piston rod 26, the screw bolt 32 at the head 33 is turned and thus moves the spring brake piston 24 into the operating position in which the spring brake piston 24 reaches its maximum working stroke.

For the purpose of removing the assembly unit 24, 27, 30 and 32 from an operational spring brake cylinder 10, according to the presently preferred practice of the invention, the spring brake piston 24 is moved into a position below its maximum working stroke by the tensioning device 30, 36, 31, and 32. After removing the cover 40, the head 33, and the screws 38, the assembly unit 24, 27, 30 and 32 can be taken out of the cylinder 10.

Reference should also be made to our co-pending application, Ser. No. 892,515, filed Aug. 4, 1986, entitled "Motor Vehicle Spring Brake Cylinder," which is incorporated herein by reference, for a teaching of a suitable coil compression spring.

While a presently preferred embodiment of the present invention has been described in detail above, it should be obvious to those persons skilled in the vehicle braking art that other modifications and adaptations can be made to the invention without departing from the spirit and scope of the appended claims.

We claim:

1. A motor vehicle spring brake cylinder which is responsive in a release position to fluid pressure, said spring brake cylinder comprising:
   (a) a cylinder having a base portion;
   (b) a spring brake piston disposed for reciprocal movement within said cylinder, said spring brake piston dividing said cylinder into a spring chamber located between a base of said cylinder and a first side of said spring brake piston and a pressure chamber located on an opposite side of said spring brake piston;
   (c) a compression spring actuator disposed in said spring chamber, said compression spring actuator having a first end thereof adjacent said base of said cylinder and a second end engageable with said first side of said spring brake piston; and
   (d) a tensioning device which mechanically acts upon said spring brake piston for facilitating adjustment of a distance between said spring brake piston and said base of said cylinder, said tensioning device including:
      (i) a spring plate secured to said base of said cylinder and in engagement with an outer coil of said compression spring pointing away from said spring brake piston; and
      (ii) a screw bolt threadedly engaging said spring plate and passing axially through said compression spring and said spring brake piston to adjust a distance between said spring plate and said spring brake piston.

2. A motor vehicle spring brake cylinder, according to claim 1, wherein said spring plate is removably secured to a surface of said base of said cylinder which faces said spring brake piston.

3. A motor vehicle spring brake cylinder, according to claim 1, wherein said spring plate is removably secured to said base of said cylinder by connecting devices which can be removed from outside of said spring brake cylinder.

4. A motor vehicle spring brake cylinder, according to claim 3, wherein said connecting devices are at least one of screws and bolts.

5. A motor vehicle spring brake cylinder, according to claim 1, wherein said spring plate includes a threaded neck portion which threadedly engages said screw bolt.

6. A motor vehicle spring brake cylinder, according to claim 5, wherein said spring plate and said neck portion are formed as a single piece.

7. A motor vehicle spring brake cylinder, according to claim 1, wherein said compression spring is a helical coil compression spring.

8. A motor vehicle spring brake cylinder, according to claim 1, wherein said fluid pressure is pneumatic.

* * * * *